United States Patent [19]

Tsukimoto et al.

[11] Patent Number: 4,810,923
[45] Date of Patent: Mar. 7, 1989

[54] VIBRATION WAVE MOTOR

[75] Inventors: Takayuki Tsukimoto, Fujisawa; Takuo Okuno; Kazuhiro Izukawa, both of Yokohama; Ichiro Okumura, Yokohama, all of Japan

[73] Assignee: Canon Kabushiki Kaisha, Tokyo, Japan

[21] Appl. No.: 139,104

[22] Filed: Dec. 28, 1987

Related U.S. Application Data

[63] Continuation of Ser. No. 844,329, Mar. 26, 1986.

[30] Foreign Application Priority Data

Mar. 29, 1985 [JP] Japan .................................. 60-65455

[51] Int. Cl.$^4$ ............................................ H01L 41/08
[52] U.S. Cl. ...................... 310/323; 310/328
[58] Field of Search ................ 310/316, 317, 323, 328

[56] References Cited

U.S. PATENT DOCUMENTS 4,672,256 6/1987 Okumo et al. ...................... 310/323
4,692,652 9/1987 Seki et al. ............................. 310/323

FOREIGN PATENT DOCUMENTS 0224880 10/1986 Japan .................................... 310/323

*Primary Examiner*—Mark O. Budd
*Attorney, Agent, or Firm*—Fitzpatrick, Cella, Harper & Scinto

[57] ABSTRACT

This specification discloses a linear type vibration wave motor in which travelling vibration waves are generated by vibratory members of endless structure to frictionally drive a moving member and the moving member is disposed at a location wherein the directions of travel of the travelling waves generated on the vibratory members are the same, thereby improving the drive force.

12 Claims, 3 Drawing Sheets

VIBRATION WAVE MOTOR

This application is a continuation of application Ser. No. 844,329 filed Mar. 26, 1986.

BACKGROUND OF THE INVENTION

1. Field of the Invention

This invention relates to a linear type vibration motor in which travelling vibration wave is generated on vibratory members to frictionally drive a moving member, and in particular to the structure of the vibratory members thereof.

2. Related Background Art

The direction of the normal in the present invention will be defined here on the basis of FIG. 6 of the accompanying drawings. In FIG. 6, reference numeral 2 designates a vibratory member on which a travelling vibration wave is generated, reference numeral 3 denotes a moving member frictionally driven by the travelling vibration wave, letter U designates a direction in which the travelling vibration wave travels, and letter N denotes a direction in which the moving member 3 is moved. Reference numeral 10 designates the vibration plane of the travelling vibration wave generated on the vibratory member 2, and arrow 20, perpendicular to plane 10 and pointing to the moving member 3 from the vibratory member 2, is defined as the direction normal to the vibration plane 10.

In recent years, numerous vibration wave motors have been proposed in which a frequency voltage is applied to an electrostrictive element to thereby generate a travelling vibration wave on a vibratory member and drive a moving member which is in frictional contact with the vibratory member. However, such vibration wave motors have suffered from a drawback in that the vibratory member is single and the drive force is small. A vibration wave motor in which a plurality of vibratory members, for example, two vibratory members, are provided to overcome such a disadvantage is disclosed, for example, in U.S. Pat. No. 4,562,374. However, the linear type vibration wave motor disclosed in this patent is of the type in which two vibratory members for transmitting a drive force to impart a strong drive force to a moving member sandwich the moving member therebetween. In the vibration wave motor of such construction, there has been a drawback in that the advantage which should originally be a feature of a thin and compact vibration wave motor is reduced. Also, in the case of such a linear type motor, in which the moving member is sandwiched, the moving member is restricted to a planar shape. Other conveyed objects cannot be placed on the moving member, because they were placed on the moving member, the conveyed object would be damaged.

SUMMARY OF THE INVENTION

It is an object of the present invention to eliminate the above-noted drawbacks and to provide a vibration wave motor characterized in that at least two vibratory members are provided and the vibratory members are disposed so that the directions of the normals to the vibration planes of travelling waves generated on the vibratory members are the same, that a moving member is disposed on the vibration planes and frictionally driven, and that the drive force to the moving member is enhanced and a conveyed object on the moving member is not damaged while making the most of the advantage of the vibration wave motor that it is thin.

Other objects of the present invention will become apparent from the following detailed description thereof.

DESCRIPTION OF THE PREFERRED EMBODIMENTS

Embodiments of the present invention will hereinafter be described with reference to the drawings.

Figure 1:
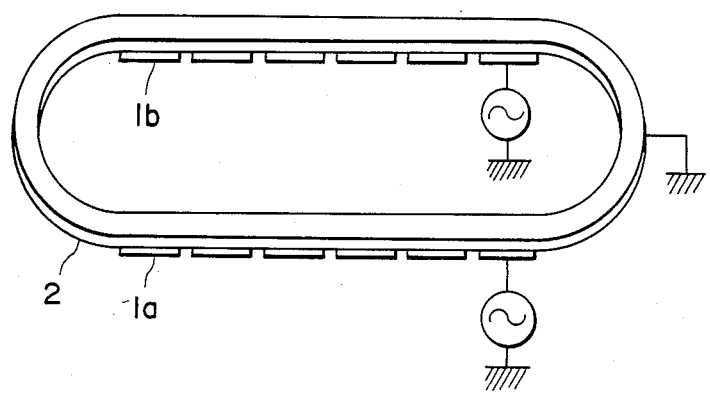
FIG. 1 is a perspective view of an elliptical stator which is the vibratory member of a vibration wave motor.

Reference is first had to FIG. 1 to describe the construction of the vibratory member of a vibration wave motor.

FIG. 1 is a perspective view of a stator of elliptical endless structure which is a vibratory member.

In FIG. 1, reference characters 1a and 1b designate piezoelectric elements, and reference numeral 2 denotes a vibratory plate. The polarization and arrangement of the piezoelectric elements and the manner of application of two-phase AC electric fields thereto are conventional. That is, the piezoelectric elements 1a and 1b are arranged with a predetermined angle phase difference being spatially provided therebetween, and AC electric fields having the same predetermined angle phase difference in time therebetween are applied to the elements 1a and 1b to thereby generate a travelling surface wave.

Figure 2:
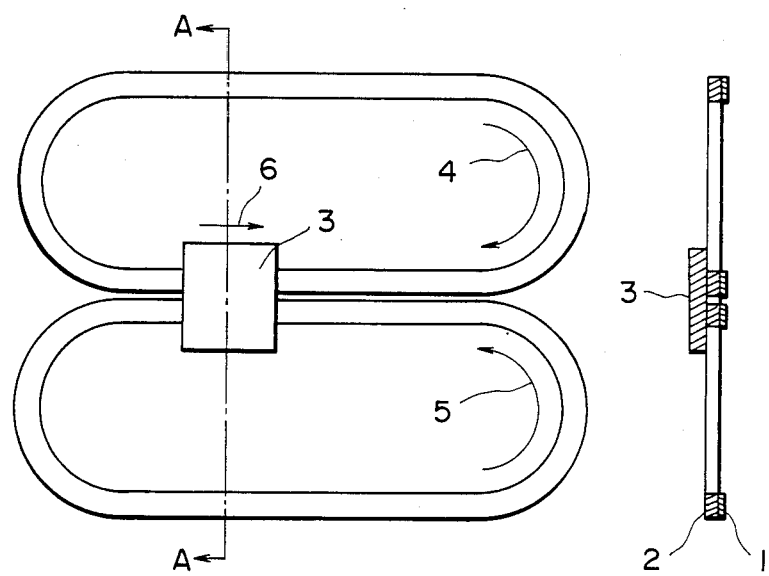
FIG. 2 is a plane view of a vibration wave motor according to a first embodiment of the present invention and a cross-sectional view taken along line A—A' of the plan view.

FIG. 2 is a plan view of a vibration wave motor according to a first embodiment of the present invention and a cross-sectional view taken along line A—A' of the plan view. Reference numeral 3 designates a conveyed object which is urged against a vibratory plate. In FIG. 2 and so on, elements functionally similar to the elements shown in FIG. 1 are given similar reference numerals and need not be described. In such an embodiment, two elliptical stators are provided and travelling waves of opposite revolutions are generated in the stators. For example, if travelling waves are generated in directions indicated by arrows 4 and 5, the conveyed object 3 will be driven in a direction indicated by arrow 6. Also, if the directions of travel of the travelling wave are reversed, the conveyed object 3 will be driven in the direction opposite to the direction of arrow 6. According to the present embodiment, the conveyed object 3 is driven by two stators and therefore, the drive force can be increased.

Figure 3:
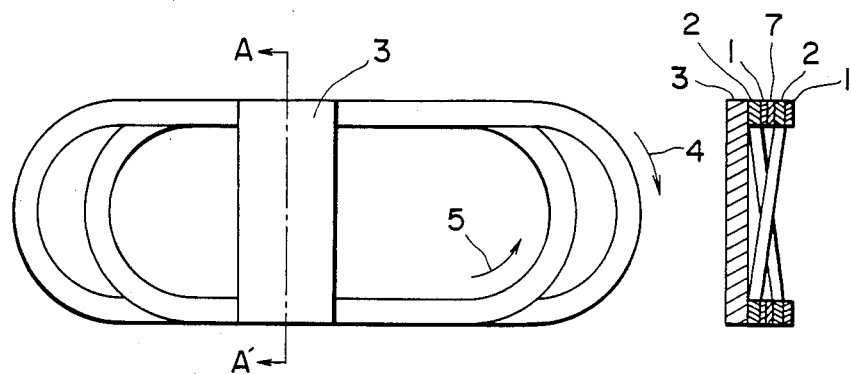
FIG. 3 is a plan view of a vibration wave motor according to a second embodiment of the present invention and a cross-sectional view taken along line A—A' of the plan view.

FIG. 3 is a plan view of a vibration wave motor according to a second embodiment of the present invention and a cross-sectional view taken along line A—A' of the plan view. In such an embodiment, two elliptical stators 2 are disposed in combination while being obliquely inclined relative to each other, and a vibration preventing member 7 is provided on a portion at which the stators 2 overlap each other, in such a manner as to be sandwiched between the stators 2, so that vibrations generated in the respective stators 2 do not affect each other. Also, travelling waves generated in the respective stators 2 are opposite to each other in the direction indicated, for example, by arrows 4 and 5.

According to the present embodiment, as compared with the embodiment shown in FIG. 2, the width of the vibration wave motor can be made small.

Figure 4:
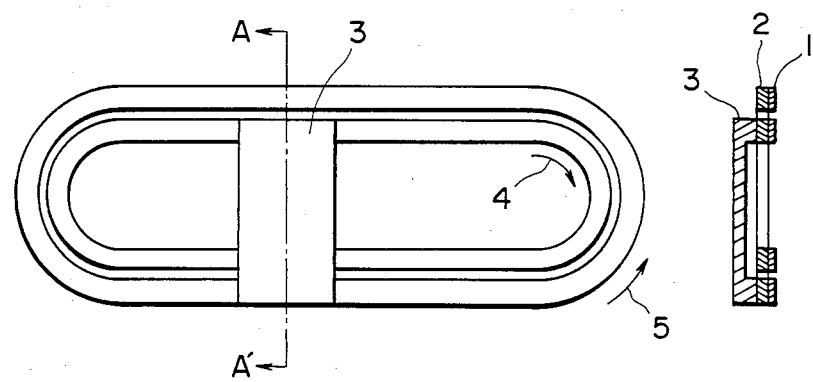
FIGS. 4 and 5 are plan views of vibration wave motors according to third and fourth embodiments of the present invention and cross-sectional views taken along lines A—A' of the plan views.

FIG. 4 is a plan view of a vibration wave motor according to a third embodiment of the present invention and a cross-sectional view taken along line A—A' of the plan view. In such an embodiment, one of the elliptical stators is configured so as to surround the other stator, and as shown in the cross-sectional view, a conveyed object 3 is constructed so as to stride over a side of the interior elliptical stator. According to the present embodiment, as compared with the embodiment shown in FIG. 3, the thickness of the vibration wave motor can be made small and further, the width thereof is not as great as in the embodiment shown in FIG. 2.

Figure 5:
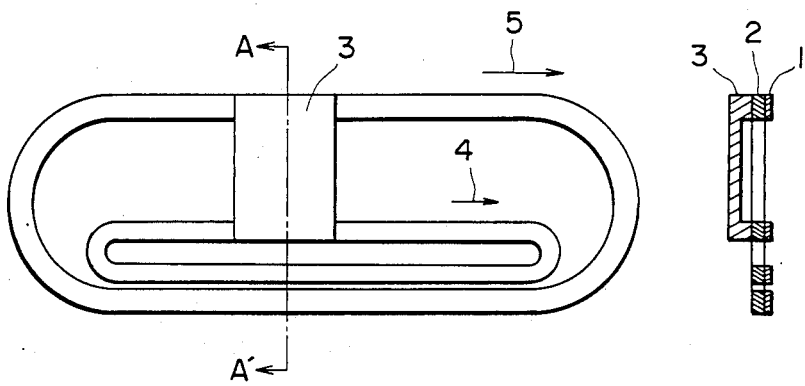
Figure 6:
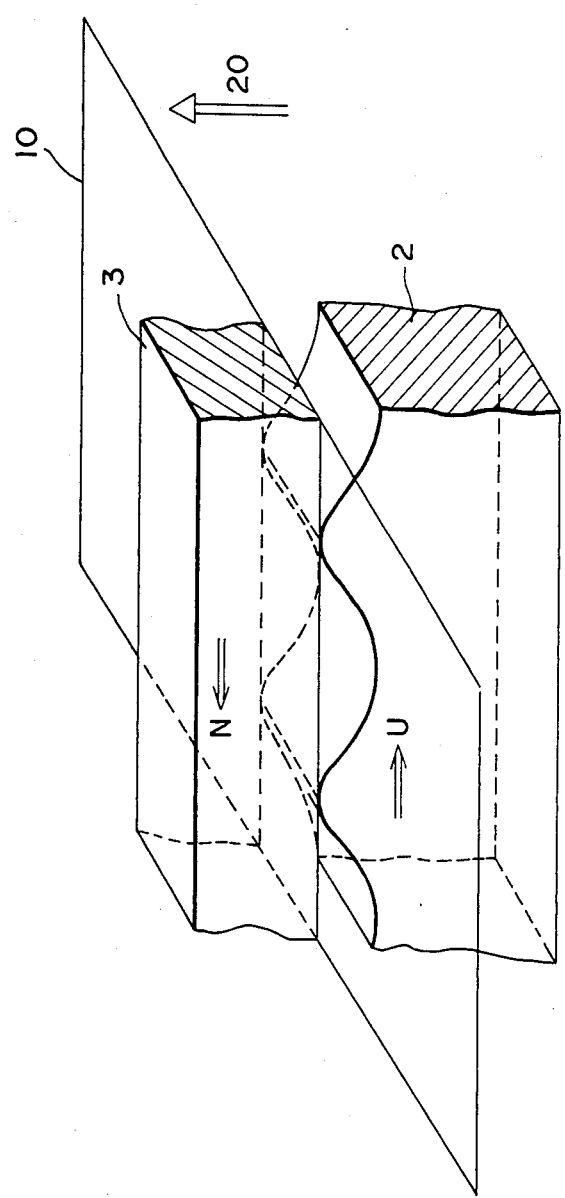
FIG. 6 is a perspective view of a vibration wave motor according to the prior art.

FIG. 5 is a plan view of a vibration wave motor according to a fourth embodiment of the present invention and a cross-sectional view taken along line A—A' of the plan view. In the embodiment shown in FIG. 4, the directions of the vibrational movements of the stators are opposite to each other, whereas in the present embodiment, the directions of movement of the stators are the same.

In the above-described embodiments, two elliptical stators which are vibratory members are combined, but alternatively, three or more elliptical stators may be combined.

In the present embodiment, elliptical stators are used as the vibratory members, but vibratory members of other shapes may also be used.

Also, in the present embodiment, piezoelectric elements are used as the electro-mechanical energy converting elements, but of course, electrostrictive elements or magnetostrictive elements may also be used.

Further, the shape of the stators has been shown as an ellipse, whereas this shape is not restrictive and a variety of endless loop configurations are possible. The gist of the present invention resides in that the moving member is disposed at a location wherein the directions of travel the normals to the vibration planes of the travelling vibration waves generated in the plurality of vibratory members are the same.

According to the present invention, as described above, the moving member is driven by the plurality of vibratory members and therefore, the drive force of the vibration wave motor can be made great, and to obtain the same drive force, the thickness of the vibration wave motor can be made small and there is no possibility of the conveyed object being damaged.

What is claimed is:

1. A vibration wave motor comprising:
(a) first endless loop vibration means having first electro-mechanical conversion elements for generating a first travelling vibration wave when electrical signals having a phase difference therebetween are applied to said first elements, said first endless loop vibration means including a first portion having a surface and a second portion provided at a position opposite the first portion;
(b) second endless loop vibration means having second electro-mechanical conversion elements for generating a second travelling vibration wave when electrical signals having a phase difference therebetween are applied to said second elements, said second endless loop vibration means having a third portion provided at a position adjacent said first portion of said first endless loop vibration means, and a fourth portion having a surface provided at a position adjacent said second portion of said first endless loop vibration means, such that a forward direction of second travelling vibration wave is opposite that of said first travelling vibration wave; and
(c) bar shaped movable means press-contacted and friction driven by said first portion of said first endless loop vibration means and said fourth portion of said second endless loop vibration means.

2. A vibration wave motor according to claim 1, wherein said first electro-mechanical conversion elements of said first endless loop vibration means include a piezoelectric element.

3. A vibration wave motor according to claim 1, wherein said second electro-mechanical conversion elements of said first endless loop vibration means include a piezoelectric element.

4. A vibration wave motor according to claim 1, wherein said said first electro-mechanical conversion elements, of said first endless loop vibration means are arranged on a side opposite said surface on said first portion.

5. A vibration wave motor according to claim 1, wherein said second electro-mechanical conversion elements of said second endless loop vibration means are arranged on a side opposite said surface on said fourth portion.

6. A vibration wave motor according to claim 1, wherein said first endless loop vibration means overlap said second endless loop vibration means, one edge of said bar shape movable means press-contacting said surface on said first portion, and the other edge press-contacting said surface on the fourth portion.

7. A vibration wave motor according to claim 6, wherein said third portion of said second endless loop vibration means is provided adjacent the lower side of said first portion of said first endless loop vibration means, and said fourth portion of said second endless loop vibration means is provided adjacent the upper side of said second portion of said first endless loop vibration means.

8. A vibration wave motor comprising:
(a) first endless loop vibration means having first electro-mechanical conversion elements for generating a first travelling vibration wave when electrical signals having a phase difference therebetween are applied to said first elements, said first endless loop vibration means including a first portion having a surface and a second portion provided at a position opposite said first portion;
(b) second endless loop vibration means having second electro-mechanical conversion elements for generating a second travelling vibration wave when electrical signals having a phase difference therebetween are applied to said second elements, said second endless loop vibration means having a third portion provided at a position adjacent said first portion of said first endless loop vibration means, and a fourth portion having a surface provided at a position adjacent the second portion of said first endless loop vibration means, such that a forward direction of said second travelling vibration wave is opposed to that of said first travelling vibration wave, said first and second endless loop vibration means being located on the same plane, such that said second endless loop vibration means is located inside of said first endless loop vibration means; and (c) bar shaped movable means press-contacted and friction driven by said first portion of said first endless loop vibration means and said fourth portion of said second endless loop vibration means.

9. A vibration wave motor according to claim 8, wherein said first electro-mechanical conversion elements of said first endless loop vibration means include a piezoelectric element.

10. A vibration wave motor according to claim 8, wherein said second electro-mechanical conversion elements of said second endless loop vibration means include a piezoelectric element.

11. A vibration wave motor according to claim 8, wherein said first electro-mechanical conversion elements of aid first endless loop vibration means are arranged on a side opposite said surface on said first portion.

12. A vibration wave motor according to claim 8, wherein said second electro-mechanical conversion elements of said second endless loop vibration means are arranged on a side opposite said surface on said fourth portion.

* * * * *

UNITED STATES PATENT AND TRADEMARK OFFICE
CERTIFICATE OF CORRECTION

PATENT NO. : 4,810,923
DATED : March 7, 1989
INVENTOR(S) : Takayuki Tsukimoto, et al.

It is certified that error appears in the above-identified patent and that said Letters Patent is hereby corrected as shown below:

COLUMN 1:

Line 10,   "travelling" should read --a travelling--.

Line 55,   "because they" should read --because if they--.

COLUMN 2:

Line 11,   "plane view" should read --plan view--.

COLUMN 3:

Line 9,    "direction" should read --directions--.

Line 50,   "travel" (first occurrence) should be deleted.

COLUMN 4:

Line 17,   "bar shaped" should read --bar-shaped--.

Line 30,   "said said" should read --said--.

Line 31,   "elements," should read --elements--.

Line 40,   "overlap" should read --overlaps--.

Line 42,   "bar shape" should read --bar-shaped--.

UNITED STATES PATENT AND TRADEMARK OFFICE
CERTIFICATE OF CORRECTION

PATENT NO. : 4,810,923

DATED : March 7, 1989

INVENTOR(S) : Takayuki Tsukimoto, et al.

It is certified that error appears in the above-identified patent and that said Letters Patent is hereby corrected as shown below:

COLUMN 5:

Line 12, "bar shaped" should read --bar-shaped--.

COLUMN 6:

Line 9, "aid" should read --said--.

Signed and Sealed this

Twelfth Day of December, 1989

Attest:

JEFFREY M. SAMUELS

Attesting Officer     Acting Commissioner of Patents and Trademarks